Feb. 10, 1942.    R. A. HIGONNET    2,272,607
NAVIGATION SYSTEM AND APPARATUS
Filed Nov. 2, 1939    3 Sheets-Sheet 1

Inventor
R. O. Higonnet
by Ed Phinney
Attorney

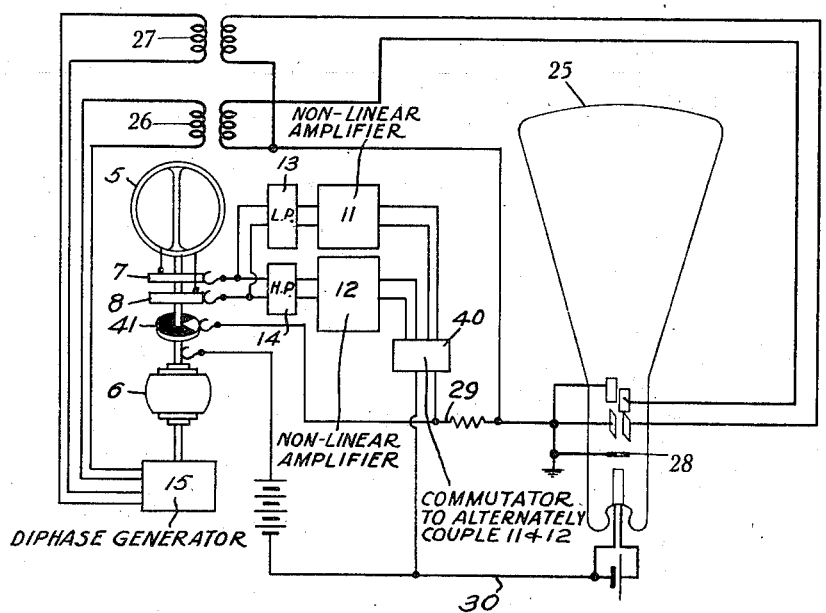
Fig. 4.
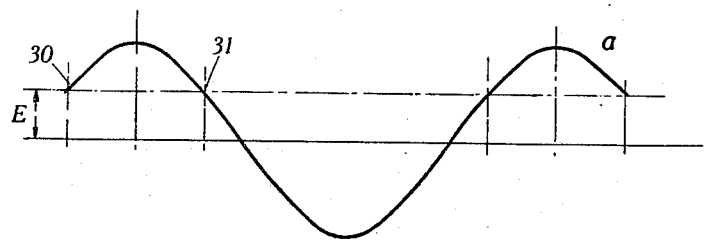
Fig. 5.
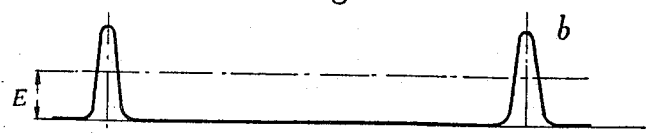

Feb. 10, 1942.  R. A. HIGONNET  2,272,607
NAVIGATION SYSTEM AND APPARATUS
Filed Nov. 2, 1939   3 Sheets-Sheet 3
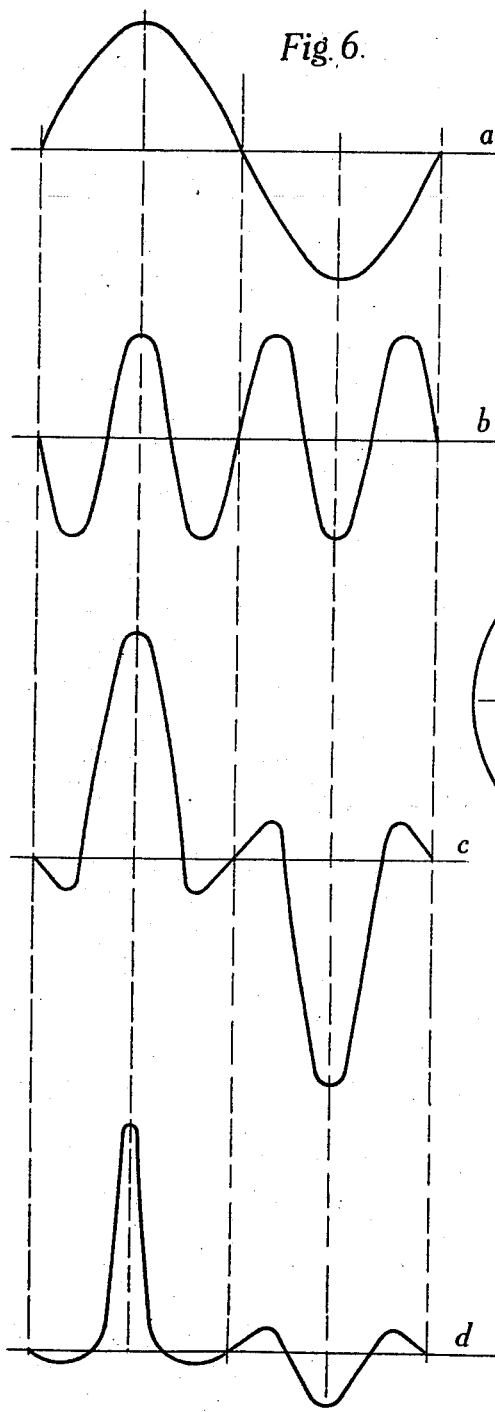
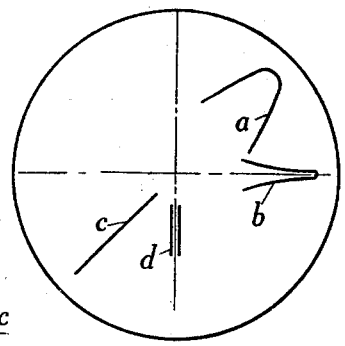
Inventor
R. A. Higonnet
by E. D. Phinney
Attorney.

Patented Feb. 10, 1942

2,272,607

UNITED STATES PATENT OFFICE 2,272,607

NAVIGATION SYSTEM AND APPARATUS

René Alphonse Higonnet, Paris, France, assignor to International Standard Electric Corporation, New York, N. Y.

Application November 2, 1939, Serial No. 302,546 In France October 15, 1938

6 Claims. (Cl. 250—11)

The present invention relates to systems and apparatus for navigation, and particularly direction indicators.

In marine or aerial navigation, apparatuses are employed which render it possible to obtain either by more or less complicated operations, or by direct reading, the direction of a radio-transmitting station, or the direction of the magnetic north with respect to the axis of the vehicle, which will be assumed in this specification to be an aeroplane, although the invention is applicable to any other type of vehicle. The angular direction of the station with respect to the longitudinal axis of the aeroplane is called the "bearing" of the radio transmitting station. In addition to the bearings of transmitting stations, compasses are employed giving the direction of the north, the angle of this direction with the longitudinal axis of the aeroplane being called the "course."

In numerous cases it is an advantage in navigation to know the "true bearing" or angle of the direction of the radio transmitting station with the north, instead of the "bearing" of this station.

For this purpose it is necessary to add to the "bearing" angle given by the radiogoniometer the "course angle" of the machine, the angle formed by the longitudinal axis of the machine with the direction of the north, this operation involving the drawback of having to refer to various indicating apparatus.

One of the objects of the present invention is to provide an apparatus permitting the automatic determination of the various angles useful in navigation by direct observation of single device.

It is well known that the rotation of a frame aerial in the terrestrial magnetic field generates an alternating current the phase of which is characteristic of the direction of the terrestrial magnetic field. Thus, by comparison of the phase of this current with that of a current generated by a local generator synchronous with the rotation of the frame aerial, it is possible to obtain an indication of the north-south angular direction with respect to any reference axis such as the longitudinal axis of an aeroplane, that is, the "course."

In the same way an alternating current is obtained the phase of which is characteristic of the direction of a radio transmitting station at the output of a detector amplifier connected to a rotating frame aerial.

By comparison with the phase of a current generated by a generator rotating in synchronism with the frame aerial, it is possible as previously explained to obtain by measurement of phase difference between the two currents, the direction of the station, that is the "bearing."

Another object of the present invention is to obtain directly the angular north-south direction with respect to the direction of the radio transmitting station, that is to say, the "true bearing." As explained above, this can be obtained in accordance with one of the characteristics of the invention by measuring the angle of phase difference between current generated in the rotating frame aerial by the magnetic field on the one hand, and by the radio-electric field on the other hand after detection.

In accordance with other characteristics of the invention, it is also possible to employ a local generator synchronous with the rotating frame giving a reference current with respect to which it is possible to obtain the indications previously explained of the "course" and of the "true bearing," of the radio transmitting station.

These indications may be obtained either simultaneously on the same indicator system, or separately on various indicator systems the indications of which can be combined according to the desired purpose.

The other objects and characteristics of the invention will be explained in more detail in the following description taken in conjunction with the accompanying drawings, in which:

Fig. 4 represents an embodiment of the invention employing a cathode ray oscillograph;

Figs. 5 and 6 represent curves employed in the explanation;

Fig. 7 represents the figures obtained on the screen of the cathode ray oscillograph.

Figure 1:
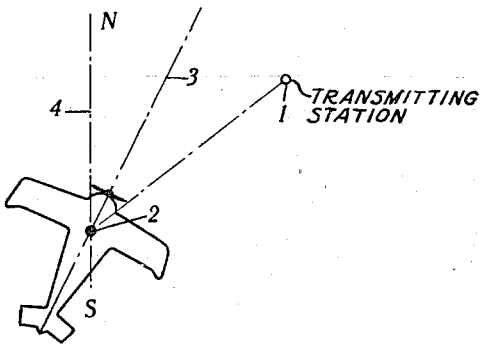
Fig. 1 shows an aeroplane and the angles which are formed with the longitudinal axis of the aeroplane by the direction of the north and the direction of a radio-transmitting station.

Referring to Fig. 1, the direction of the radio transmitting station 1 with respect to the aeroplane 2 is given by the line 1—2. The longitudinal axis of the aeroplane is represented by the line 2—3, and the direction of the north by the line 2—4. It will be observed from this drawing that the ordinary radio-goniometers give the value of the angle 1—2—3 (bearing); the course angle is the angle 3—2—4.

One of the objects of the present invention is to obtain by simple direct reading the value of the angle 1—2—4 or "true bearing."

Figure 2:
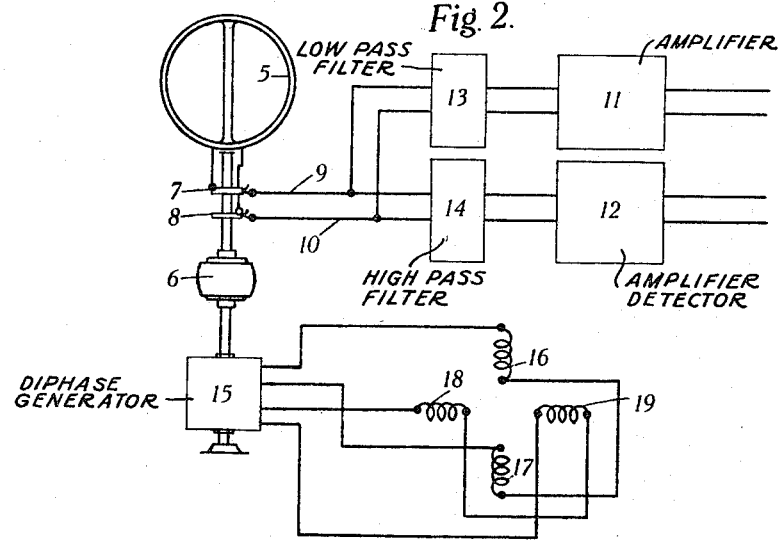
Fig. 2 represents an embodiment of the invention employing a mechanical indicator apparatus.

Fig. 2 shows an embodiment employing an electro-mechanical system.

In this example, 5 is a rotating frame aerial driven by a motor 6, the frame aerial 5 being provided with two rings 7 and 8 and two wipers 9 and 10 which convey the induced currents in the aerial 5 to the amplifier circuits. These circuits are of two kinds, the one 11 is for the amplification of the currents induced by the terrestrial magnetic field, that is to say, a low frequency amplifier, amplifying frequency corresponding to the rhythm of rotation of the rotating frame 5, and the other, 12, which amplifies and detects the currents of radio-frequency.

Fig. 2 shows two filter circuits 13 and 14 which may be of types well known in the art, and may consist of more or less complicated members according to the frequencies concerned.

It is clear that instead of employing a single frame aerial for the two currents induced, it is possible to provide on the same axis two different loops since it may be an advantage to construct them with different numbers of turns. These two loops may either be concentric, or one above the other, or in any other respective position.

There is also mounted on the same axis the generator 15 providing a current which serves as a reference current for the measurement of the phase difference of the two currents at the output of the amplifiers 11 and 12.

In the embodiment shown, the generator 15 is a diphase generator, supplying an indicator apparatus 16, and producing by means of coils 16, 17, 18, 19 a field rotating in synchronism with the frame 5.

The generator 15 may be of a known type with inductance or with potentiometric resistances.

There are placed in the rotating field two rotatable coils (not shown), each carrying a compass card, and which are wound independently and rotated, around the same axis.

If these rotatable coils are respectively connected to the output of the amplifiers 11 and 12 they will take an orientation in the field of the coils 16, 17, 18 and 19, which corresponds exactly to the phase difference between the rotating field generated by these four coils and the current coming from the amplifiers 11 and 12.

Figure 3:
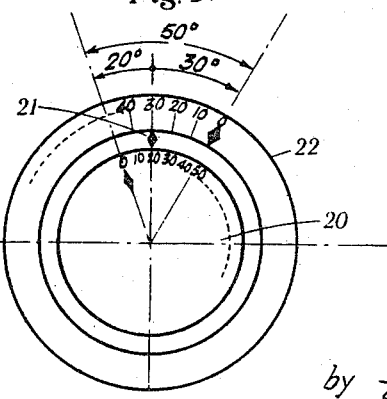
Fig. 3 represents a device for indicating angles.

The arrangement of the compass cards in one unit with the two movable coils may be carried out in various ways. Fig. 3 shows an example.

In the centre is a circular compass card 20 secured to the movable coil corresponding to the amplifier 11, that is the coil which is orientated in accordance with the direction of the terrestrial magnetic field.

In front of an index 21, it is possible to read the course (20° in the example shown).

The annular compass card 22 is secured to the second rotatable coil.

It is possible to read in front of the fixed mark 21 the "bearing" of the radio station (30° on the drawings). The true bearing is read directly on the course compass card 20, in front of the marking composed of the zero of the annular compass card 22 (50° on the drawings); the true bearing is the sum of the course and of the "bearing" of the radio station.

Modifications are also possible of this device which is only mentioned by way of example; the moving compass card 22 may be replaced by a rotatable index, moving with respect to a fixed circular compass card.

Fig. 4 shows another embodiment in which a cathode ray oscillograph is employed.

In this embodiment the members shown in Fig. 2 are employed with the exception of the coils 16, 17, 18, 19 and similar reference characters are applied thereto.

The reference current generated by the generator 15 is applied to the deflecting electrodes of a cathode ray oscillograph for example, through transformers 26, 27, so as to produce such a rotating electrical field that when the oscillograph is normally fed and the deflecting plates and the electron gun 28 are brought to the operative potential of the tube the light spot describes a circle in synchronism with the rotation of the frame aerial 5.

Instead of feeding the oscillograph with a constant plate potential, this latter is generally eliminated, and the potential derived from the amplifier 11 or 12 is applied alternately by commutator 40 to the anode 28 of the electron gun, and to the deflecting plates and cathode by conductors 29 and 30.

The potential applied in this way is, if the amplifiers have no distortion, practically sinusoidal, as shown in Fig. 5 at (a). At a certain potential E, a light spot appears on the screen of the cathode ray tube and is displaced radially from the centre circle towards the periphery when the potential increases, returning toward the centre and disappearing when the potential decreases. The angular position of the figure thus described by the spot depends upon the orientation of the electrostatic rotating field at this moment. The tube remaining illuminated during the moments which elapse whilst the potential varies from 30'—31, there is thus obtained on the screen of the oscillograph a marking of the type shown at $a$ in Fig. 7, the orientation of which depends upon the orientation of the frame aerial at the moment during which the current induced in the frame passes through a positive maximum (if there be no change of phase in the intermediate members).

In order to obtain a simple indication the wave proceeding from the amplifiers 11 and 12 may be distorted by means of devices such as rectifiers or electronic apparatus distorting the wave as shown in Fig. 5 (b). Thus, there is obtained on the screen a marking of the type $b$ in Fig. 7. Moreover, the elimination of the negative potentials has the advantage of facilitating the operation of the apparatus simultaneously by signals from several sources, such as the amplifiers 11 and 12.

The distorting devices may be provided in order to cause a predetermined harmonic frequency to appear, for example, the third or higher harmonic with the amplitude and phase necessary to give the wave the peaky form desired. If the potentials below a certain value have no effect, the only useful portion would be the peak of the potential wave of this harmonic, when it is added to the positive portion of the fundamental wave. Thus, a marking can be obtained on the oscillograph which is similar to a simple radial line.

The generation of the harmonic chosen may be obtained by apparatus well known in the art, such as electronic apparatus, filters, etc.

In another embodiment of the invention the fundamental potential frequency proceeding directly from the frame aerial after amplification may be utilised to control the polarisation of an amplifier valve which amplifies a higher harmonic frequency generated from the fundamental wave.

The amplification of the harmonic chosen, for example, the third will thus only be possible during the periods when the fundamental current is maximum.

Fig. 6 shows the forms of the curves obtained in the case chosen by way of example of a harmonic of the third order.

The curve $a$ of Fig. 6 represents the fundamental current, the curve $b$ the third harmonic, the curve $c$ the sum of these two curves without distortion. It will be seen that on this curve the variation of the potential is far more abrupt. The curve $d$ represents the potential curve after the action of a distorting system such as a thermionic valve suitably polarized towards the bend of its characteristic, thus an extremely rapid potential variation is obtained which will practically give on the oscillograph a simple radial dash.

The curves obtained in polarising an amplifier amplifying potential frequency of the harmonic ($b$) by the fundamental potential ($a$) or applying to the anode of the oscillograph the potential ($b$) and by applying the potential ($a$) to a modulation grid of the cathode ray oscillograph are similar.

These various means, and the suppression of the negative potentials by a rectifier system in order to prevent these negative potentials from interfering with the production of simultaneous indications may, of course, be combined with each other, without departing from the scope of the invention.

It is also possible, as in the apparatus previously described, to have on the screen of the oscillograph, indications of the direction of the north, of the direction of a given station, and even of any axes of reference, such as the axis of reference formed by the longitudinal axis of the aeroplane. For this purpose a commutator 41 is arranged on the axis of the rotating frame with a wiper connected with the anode of the electron gun of the oscillograph, and giving a contact of short duration with a source of potential. If this period is sufficiently short a simple dash will be obtained, as at $c$, Fig. 7. It is possible, in order to identify this direction, to provide several contacts in order to obtain, for example, as at $d$, Fig. 7, a central dash with two shorter lateral dashes.

It is thus possible to cause the angle of drift to appear on the screen of the oscillograph, that is to say, the angle between the longitudinal axis of the aeroplane and the true route followed by it on account of the influence of the wind.

Thus the pilot can see directly and simultaneously on the screen of the oscillograph his true direction, the north-south line, the direction of one or more radio electric stations.

In effect, it is possible to obtain on the same screen indications corresponding to several radio transmitting stations; it is sufficient for this purpose to provide as many control receiving circuits as there are stations which it is desired to receive.

It is also possible to arrange that the indications of the apparatus are given with respect to the true route of the aeroplane by displacing all the indications by an angle equal to the drift, by causing the field of reference to rotate at an angle equal to that of the drift. For this purpose it is possible either to rotate the brushes or the inductors of the reference generator, or to rotate the whole of the cathodic apparatus, or to rotate the system producing the rotating field, if the latter is composed of inductance coils instead of being electrostatic, as shown in Fig. 4.

It is also possible to produce angular indications in degrees in the form of luminous dashes. It is sufficient for this purpose to arrange as many contacts as desired on the commutator carried on the shaft of the frame aerial, the operation of which has been explained above. The indication obtained in this way is automatically corrected with regard to the defects due to the reference current generator, or to the cathode ray tube itself.

It is also possible in arranging the above contacts to take into consideration the quadrantal distortion caused by the metal parts of the aeroplane. It is sufficient for this purpose to displace these contacts in accordance with the result of the tests.

In order to facilitate the identification of the indications of the apparatus, keys may be provided in order to eliminate the indications, either of the direction on the terrestrial field, or that of the radio transmitting stations, or in order to distort them momentarily for the same purpose.

It is also possible to give them different shapes by means of circuits which are employed in order to give to the curve of the potential a more abrupt shape (as explained with regard to Fig. 6).

Although the invention has been described in relation to the above embodiment it is clear that it is in no way limited thereto, and is capable of numerous variations and applications without departing from its scope.

The invention relates to systems and apparatus for navigation.

It provides in particular a system of radiogoniometry combined by an electromagnetic system influenced by the terrestrial field in such a way that the direction of a radiogoniometric station can be given with respect to the direction magnetic north-south, either directly, or these two directions may be marked with respect to a given axis such as the longitudinal axis of a vehicle.

In particular, an embodiment utilising a cathode ray oscillograph is given in which a reference current produces a rotating field, the anode potential of the oscillograph is that induced in a rotating frame by the terrestrial field, or a radio-electric station properly amplified in such a way that the spot only appears at the moment when the current in the frame passes through a positive maximum, that is to say, once per revolution, or radial dash of which the orientation depends upon the position of the rotating frame at that moment, that is to say, upon the direction of the terrestrial field, or of the radio-electric station.

On the same oscillograph dial it is also possible to have simultaneously the direction of the north of one or more radio-electric stations, of one or more reference axes, the angle of drift, etc.

What is claimed is:

1. An automatic direction finder comprising a rotatable frame aerial, means for rotating said aerial in the earth's magnetic field to generate potentials of a given frequency dependent upon the speed of rotation of said aerial and in the field due to the radio transmission station to generate a current of a second frequency, a detector for said second frequency current to change it to said given frequency, a source of reference current of said given frequency, a cathode-ray oscillograph indicator having a screen, a deflecting system and an electron gun including an anode and deflecting electrodes, means for producing a rotating field by applying said reference current to the deflecting system of said oscillograph and means for applying the alternating potentials generated in said aerial to the anode of the electron gun of said oscillograph so that no spot appears on the screen thereof except when the amplitude of said applied potentials pass through a predetermined value and through its positive maximum value and means for simultaneously applying said alternating potentials to the deflecting electrodes, whereby a radial flash whose angular position is indicative of the direction of the field producing said potential appears on said screen.

2. An automatic direction finder in accordance with claim 1 characterised in this that it includes means for producing a thin radial flash.

3. An automatic direction finder in accordance with claim 1 characterised in this that it further comprises a non-linear amplifying electric circuit, means for applying the alternating potentials induced in said aerial to said amplifying circuit, whereby said potentials are distorted so as to present a steeper potential variation near the maximum, thus producing a thinner radial flash.

4. An automatic direction finder in accordance with claim 1 characterised in this that it includes means for applying to the anode of the cathode ray oscillograph electron gun, a potential impulse to cause a radial flash to appear on the screen which is indicative of the axis of the vehicle.

5. An automatic direction finder in accordance with claim 1 characterised in this that it includes means for applying to the anode of the cathode ray oscillograph electron-gun a potential impulse to cause a radial flash to appear on the screen to provide an angular indication of a compensation desired to be made.

6. An automatic direction finder in accordance with claim 1 characterised in this that a commutator is carried on the shaft of the rotating frame aerial, and conductors are provided connecting said commutator to the anode of the cathode ray tube to impart potential impulses thereto at regular angular intervals to give a radial flash on the screen corrected for undesired errors.

RENÉ ALPHONSE HIGONNET.